US012613091B1

(12) United States Patent
Hellum et al.

(10) Patent No.: US 12,613,091 B1
(45) Date of Patent: Apr. 28, 2026

(54) METHODS AND SYSTEMS FOR A WETTED-LENGTH SENSOR

(71) Applicant: The United States of America as represented by the Secretary of the Navy, Newport, RI (US)

(72) Inventors: Aren M Hellum, Wakefield, RI (US); Jesse L Belden, Dighton, MA (US)

(73) Assignee: The United States of America as represented by The Secretary of the Navy

( * ) Notice: Subject to any disclaimer, the term of this patent is extended or adjusted under 35 U.S.C. 154(b) by 400 days.

(21) Appl. No.: 17/751,775

(22) Filed: May 24, 2022

(51) Int. Cl.
| | |
|---|---|
| *G01B 11/02* | (2006.01) |
| *G01B 13/02* | (2006.01) |
| *G01N 21/47* | (2006.01) |
| *G01N 21/49* | (2006.01) |

(52) U.S. Cl.
CPC ............ *G01B 11/028* (2013.01); *G01B 13/02* (2013.01); *G01N 21/474* (2013.01); *G01N 21/49* (2013.01)

(58) Field of Classification Search
CPC .......................... G01F 23/292; Y10S 250/904
See application file for complete search history.

(56) References Cited

U.S. PATENT DOCUMENTS

| | | | | |
|---|---|---|---|---|
| 5,831,743 | A * | 11/1998 | Ramos | .................... G01F 1/661 |
| | | | | 385/85 |
| 6,965,709 | B1 * | 11/2005 | Weiss | .................... G01F 23/292 |
| | | | | 250/361 R |
| 7,049,622 | B1 * | 5/2006 | Weiss | .................... G01F 23/292 |
| | | | | 73/290 R |
| 9,222,824 | B1 * | 12/2015 | Belden | ................ G01F 23/2927 |
| 2010/0202726 | A1 * | 8/2010 | Egalon | ................ G01N 21/648 |
| | | | | 385/12 |

* cited by examiner

*Primary Examiner* — Thomas K Pham
*Assistant Examiner* — Adrian Ignacio Silva
(74) *Attorney, Agent, or Firm* — James M. Kasischke; Jeffry C. Severson

(57) ABSTRACT

A method for estimating a wetted length of a solid surface includes sensing intensity of light reflected from a gas-liquid interface on the solid surface. A waveguide faces the gas-liquid interface and a diffused light is propagated to the gas-liquid interface through the waveguide. At least one optical receiver is positioned on a side of the waveguide to receive light reflected from the gas-liquid interface.

10 Claims, 5 Drawing Sheets

METHODS AND SYSTEMS FOR A WETTED-LENGTH SENSOR

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention relates to wetted length measurement and, more particularly, to a method for measuring wetted length of a surface in contact with a fluid.

(2) Description of the Related Art

A solid body in contact with a fluid maintains an interface along the surface of the solid body. The boundary of such interface may vary continuously over regions along the length of the surface. A wetted length of a solid body is the length along the surface of the solid body in contact with the surrounding fluid. Determination of wetted length is desired in vessels such as buoys, ship hulls, and similar vessels in contact with water. Estimation of wetted length may facilitate, for example, estimation of a level of liquid in a tank, or location of a waterline on a vessel or buoy floating in water. Measurement of a contact point where a gas-liquid interface contacts a solid body may be carried out as a field measurement such as when the vessel is operating in an ocean.

Previous examples include a sensor array including a plurality of densely populated (near continuous) receivers to determine the position of a gas-liquid interface on a solid surface. However, as recognized by the inventors herein, the wetted length may cover a significant area of the solid surface and therefore a large number of receivers are employed to cover the entire wetted length. The use of the larger number of receivers may increase the cost and complexity. Further, use of a sensor array to measure the wetted length in a field measurement may add to processing time and require significant processing capacity.

SUMMARY OF INVENTION

As one example, a sensor system includes a waveguide in face-sharing contact with a gas-liquid interface and a source of diffused light. Two optical receivers are positioned on each end of the waveguide to receive light reflected from the gas-liquid interface. In this way, a wetted length on a surface may be estimated with a near-continuous spatial resolution by using only two optical receivers.

For example, to measure wetting at a surface, a waveguide is embedded in or positioned on the surface. The waveguide is positioned adjoining a portion of the surface subjected to the gas-liquid interface. The waveguide provides a totally internally reflective surface when subjected to incident light at an angle below a critical angle. Two optical receivers are positioned at two ends of the waveguide. A diffused light is incident on the gas-liquid interface via the waveguide. A portion of the diffused light may undergo total internal reflection within the waveguide. The amount of light subject to total internal reflection is based on the critical angle. The critical angle depends on the medium contacting the surface of the waveguide. The amount of light reaching the two optical receivers can provide an estimate of a length of the waveguide in contact with a liquid (completely wet) and a length of the waveguide in contact with a gas (completely dry). The point of interfacial contact between the gas-liquid interface and the waveguide may be computed from a difference in the amount of light reaching the two optical receivers and then applied for necessary operations such as fluid level control or guidance control.

In this way, by utilizing a difference in a critical angle for waveguide-gas and waveguide-liquid interfaces, the number of optical receivers can be reduced. In one example only a single or only two optical receivers can provide a wetted length on a waveguide surface with increased accuracy. A technical effect of using the difference in critical angle for sensing the wetted length is that the point of interfacial contact between the gas-liquid interface and the waveguide may be computed with reduced processing time or power needed than when using an array of sensors along the entire wetted length. Further, reduction in the number of sensors and corresponding processing time may result in a decrease in cost and complexity of the system while maintaining sufficient precision of the measurement.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description.

Furthermore, the claimed subject matter is not limited to implementations that solve any disadvantages noted above or in any part of this disclosure.

BRIEF DESCRIPTION OF THE DRAWINGS

Features of illustrative embodiments may be understood from the accompanying drawings in conjunction with the description. The elements in the drawings may not be drawn to scale. Some elements and/or dimensions may be enlarged or minimized for the purpose of illustration and understanding of the disclosed embodiments.

DETAILED DESCRIPTION OF THE INVENTION

Figure 1:
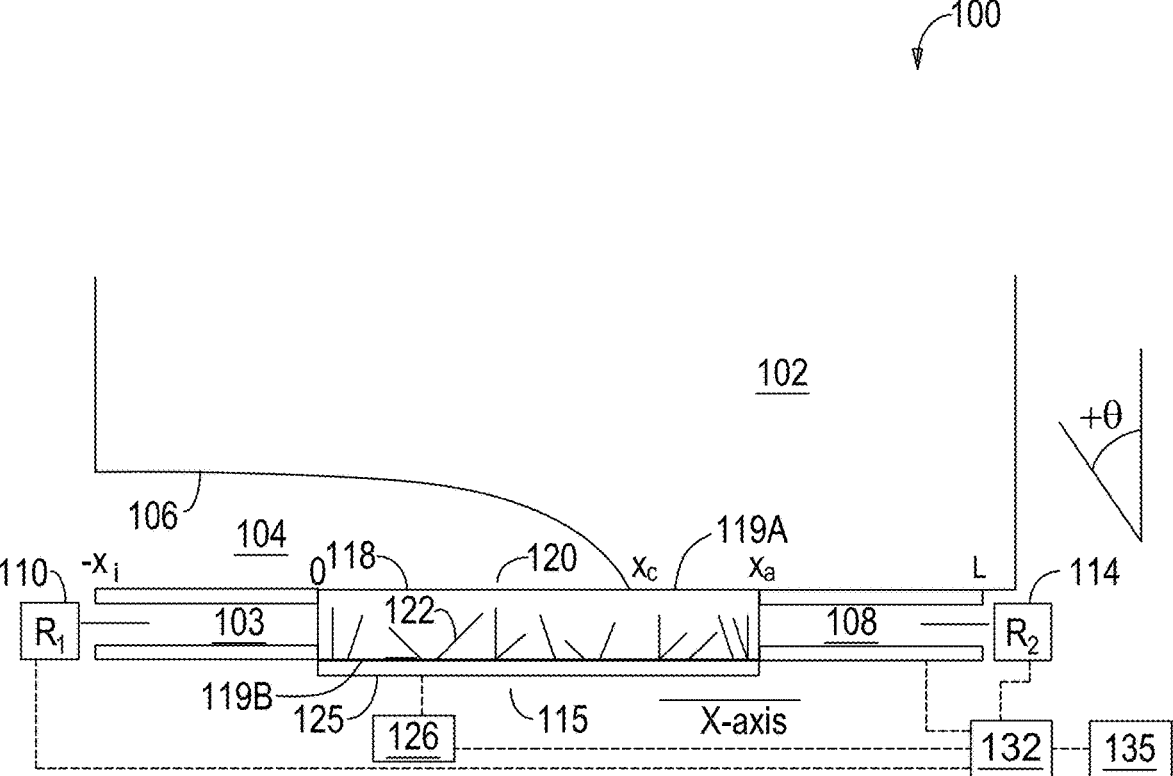
FIG. 1 is a view of a sensor system for estimating a length of a wetted surface.
Figure 4:
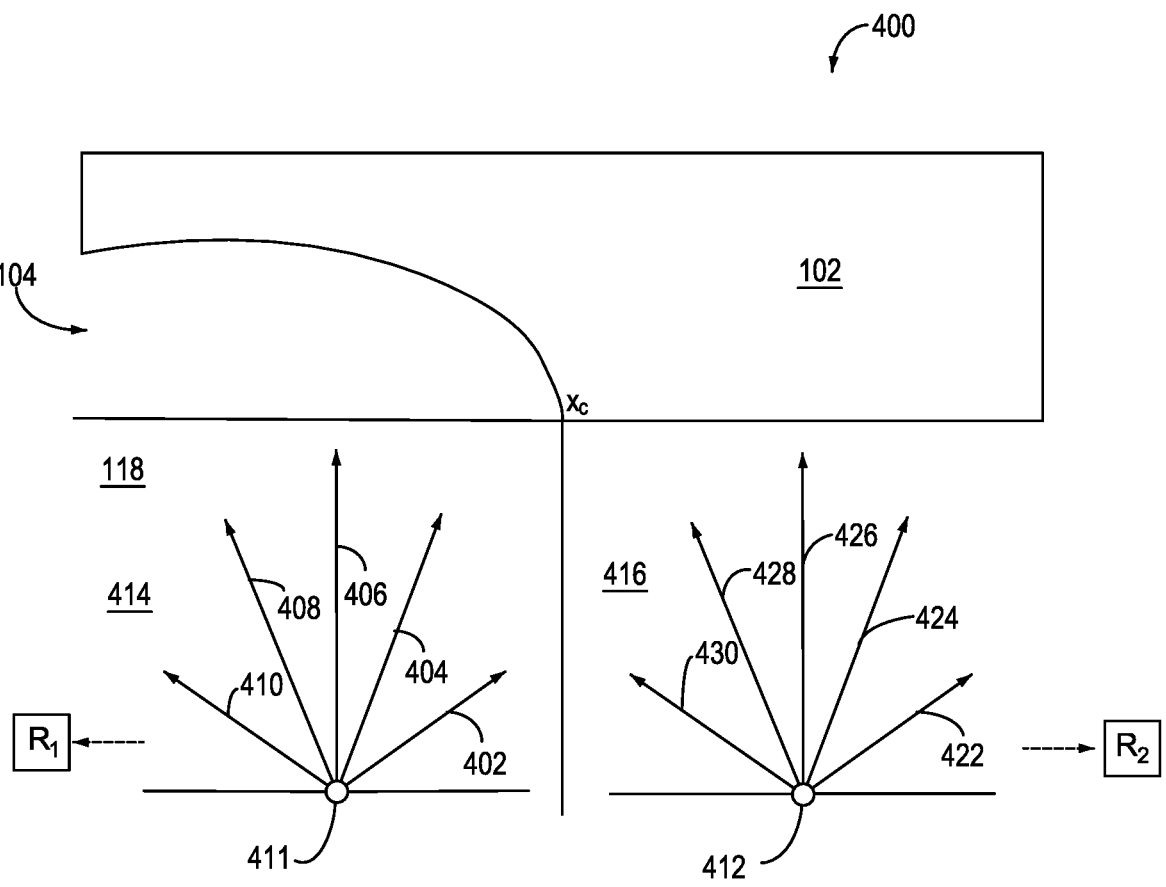
FIG. 4 shows an example ray diagram of light reaching each of the first optical receiver and the second optical receiver.
Figure 5:
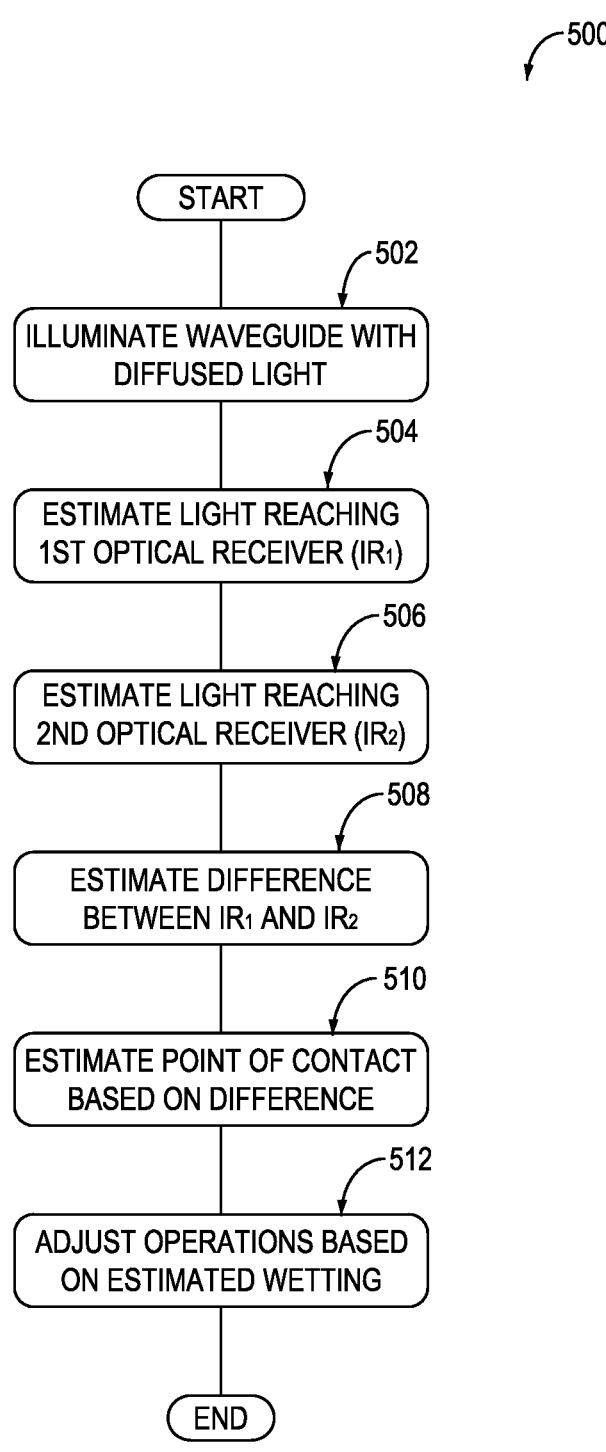
FIG. 5 shows a flow chart illustrating an example method that can be implemented to estimate wetting of a surface.

The following description relates to measurement of a wetted length of a surface via a wetted-length sensor system. In one example, the sensor system is facing a liquid-gas interface as shown in FIG. 1. The sensor system includes two optical receivers which receive light reflected within a body of the sensor system, as shown in FIGS. 2A-3E and 3A-3E. Diffused light from a light source is incident on the liquid-gas interface via a waveguide. FIG. 4 shows the origin and path of travel of light rays reaching each optical receiver of the sensor system. FIG. 5 shows an example method of operation with the system of FIG. 1.

FIG. 1 shows an example embodiment 100 of a sensor system 120 in contact with an interface 106 of liquid 102 with gas 104. The sensor system 120 may be mounted on a solid body 115. In one example, wetting may be measured where the solid body 115 is a hull of a ship, a surface of an undersea vessel, a surface of a buoy floating in water, etc. A wetted length of a surface may be the length along the surface of a vessel in contact with the surrounding fluid such as water.

The sensor system 120 may include a waveguide 118 in face sharing contact with a point of interfacial contact, $x_c$, where the liquid 102 and the gas 104 meets the waveguide 118. The waveguide 118 may be made of an optically transparent material such as glass or transparent plastic through which diffused light may be propagated. Waveguide 118 has a first surface 119A exposed to the mixed phase environment 102 and 104 and a second surface 119B proximate to body 115. In this example, the waveguide may span a central region, as shown by $0 \leq x \leq x_a$, of the sensor system 120 which spans from $-x_i$ to L. $x_a$ is the x coordinate of the end of the waveguide. The sensor system 120 may include a first section 103 on a first side of the waveguide 118, the first side located between the waveguide 118 and the first end of the sensor system at $-x_i$. The sensor system 120 may include a second section 108 on a second side of the waveguide, the second side located between the waveguide 118 and the second end of the sensor system at L. The first section 103 may be dry while the second section 108 may be wet. The first and second sections may be enclosed within a housing or a framework, and the first and second sections may also be made from an optically transparent material allowing for travel of light rays. The sections 103 and 108 may have a substantially rectangular cross-section in one example.

In one example, the length of the sensor system (from $-x_i$ to L) may be in a range of about $1 \times 10^{-3}$ m to $1 \times 10^1$ m while the length of the waveguide (from 0 to $x_a$) is a portion of the length of the sensor system, and the length of the waveguide is shorter than that of the sensor system.

A first optical receiver $R_1$ may be positioned proximal to the first side (dry side) of the waveguide proximal to a first end of the sensor system $-x_i$. In one example, the first optical receiver $R_1$ may be positioned within the first region 103 as shown in FIG. 1. A second optical receiver $R_2$ may be positioned proximal to the second side (wet side) of the waveguide proximal to a second end of the sensor system L as shown in FIG. 1. In an alternative example, the second optical receiver $R_2$ may be positioned within the second region 108. Each of the first optical receiver $R_1$ and the second optical receiver $R_2$ senses the intensity of incoming light reaching the respective receiver. In one example, the first optical receiver $R_1$ and the second optical receiver $R_2$ are semiconductor photodiodes. The first optical receiver $R_1$ and the second optical receiver $R_2$ may be positioned adjacent to the waveguide 118 (on either sides) or further away towards the ends of the first region 103 and the second region 108, respectively.

The waveguide is structured to be totally internally reflective of a certain range of incident light angles. Exemplary materials include any optically transparent material such as clear glass, clear polymer, or the like.

Diffused light source 125 such as a light emitting diode (LED) strip may be in contact with the waveguide 118 at surface 119B, and diffused light with an intensity $\hat{I}(x, \theta)$ may illuminate the waveguide 118. A portion of the diffused light is incident on the boundary between the waveguide 118 and the gas 104 at surface 119A while the remaining portion of the diffused light is incident on the boundary between the waveguide 118 and the liquid 102 at surface 119A. Light rays 122 show example directions of travel of the diffused light through the waveguide 118.

A processor 132 may be coupled to the first and second optical receivers to receive the signals therefrom. Signals from the two optical receivers can be processed at the processor 132 to determine the position of the gas-liquid interface 106 with the waveguide. In one example, the processor 132 may include an electronic controller. The processor may receive input data from the optical receivers, process the input data with instructions stored in non-transitory memory coupled with the processor, and trigger various actuators in response to the processed input data based on instruction or code programmed therein corresponding to one or more routines. For example, the processor may adjust guidance control via an actuator 135 of the vessel of which the system forms a portion.

The first critical angle for the sensor-gas interface 106 may be denoted by $\theta_{ca}$ and the second critical angle for the sensor-liquid interface 106 may be denoted by $\theta_{cw}$. These critical values are known or established experimentally. As an example, the first critical angle is different from the second critical angle ensuring a difference in the intensity of light rays being internally reflected from the sensor-gas interface 106 and the intensity of light rays being internally reflected from the sensor-liquid interface. In other words, an amount of light internally reflected from the wet section of the waveguide is different from the amount of light internally reflected from the dry section of the waveguide 118. The rays of light incident on the boundary between the waveguide 118 and the gas 104 at an angle greater than $\theta_{ca}$ may be totally internally reflected back to the waveguide 118 while the rays of light incident on the boundary between the waveguide 118 and the liquid 102 at an angle greater than $\theta_{cw}$ may be totally internally reflected back to the waveguide.

During estimation of an intensity of light reaching the first optical receiver $R_1$ and the second optical receiver $R_2$, it may be assumed that the first optical receiver $R_1$ and the second optical receiver $R_2$ do not reflect. Light may not enter or exit the ends of waveguide 118 (such as in the region x<0 and $x > x_a$) other than at the first optical receiver $R_1$ and the second optical receiver $R_2$, and the only source of loss in the system may be light ray exiting the sensor system due to its incident angle being large for internal reflection to occur. The sensor system may be assumed to be negligibly thin and the diffused light source may be assumed to have spherically symmetric intensity such that $\hat{I}(x, \theta)=\hat{I}_0$. It may be assumed that the critical angle characteristic of the medium to the left of the contact point $x_c$ (such as air) may be smaller than that on the right side of the contact point $x_c$ (such as water). The assumptions stated above may be relaxed for a sensor system that is calibrated such that other sources of light loss are well-characterized for the expected operating conditions.

Optimally, the source light should be distinguished from ambient light entering the waveguide through the gas liquid interface surface. In a first embodiment this can be performed by receiving baseline optical signals without use of light source to obtain intensity of ambient light in absence of the light source at each sensor $R_1$ and $R_2$. These baseline intensities can then be subtracted from the intensities received when the light source is utilized.

In a second embodiment, light source can be provided at a particular frequency that is distinguishable from ambient light. As one option, sensors $R_1$ and $R_2$ can be engineered to be sensitive to the particular frequency. In another option, filters can be provided over $R_1$ and $R_2$ to filter ambient light and to pass light from light source.

As another embodiment, the source light from the diffused light source may encoded or modulated so that the light may be distinguished from ambient light entering the waveguide. As an example, an amplitude modulation may be performed at the light source 125 via a modulator 126 and a band pass filter may be included in each of the first light receiver and the second light receiver. Based on application such as the nature of the vessel and sensor system, additional encoding or reference measurements may be used to filter or estimate source light reflecting from the interior of the media (gas and liquid) and re-entering the waveguide. In this example, one medium is depicted as gas while another medium is depicted as liquid, however, in other examples, the sensor system may be used to determine a wetted length of a surface interfacing with any two media having different critical angles (different densities).

The intensity of light beam reaching the first optical receiver $R_1$ is given by equation (1) and the intensity of light beam reaching the second optical receiver $R_2$ is given by equation (2).

$$IR_1 = \int_0^{x_a} \int_{-\frac{\pi}{2}}^0 \hat{I}_0 d\theta dx + \int_0^{x_c} \int_0^{\theta_{ca}} \hat{I}_0 d\theta dx + \tag{1}$$

$$\int_0^{x_c} \int_{\theta_{ca}}^{\frac{\pi}{2}} \hat{I}_0 d\theta dx + \int_{x_c}^{x_a} \int_0^{\theta_{cw}} \hat{I}_0 d\theta dx + \int_{x_c}^{x_a} \int_{\theta_{cw}}^{\frac{\pi}{2}} \hat{I}_0 d\theta dx$$

$$IR_2 = \int_0^{x_a} \int_0^{\frac{\pi}{2}} \hat{I}_0 d\theta dx + \int_0^{x_c} \int_{-\theta_{cw}}^0 \hat{I}_0 d\theta dx + \tag{2}$$

$$\int_0^{x_c} \int_{-\frac{\pi}{2}}^{-\theta_{cw}} \hat{I}_0 d\theta dx + \int_{x_c}^{x_a} \int_{-\theta_{cw}}^0 \hat{I}_0 d\theta dx + \int_{x_c}^{x_a} \int_{\frac{\pi}{2}}^{\theta_{cw}} \hat{I}_0 d\theta dx$$

where $IR_1$ is the intensity of light reaching the first optical receiver $R_1$, $IR_2$ is the intensity of light reaching the second optical receiver $R_2$, $\hat{I}_0$ is the intensity of the diffused incident light, $x_a$ is the length of the exposed waveguide, $x_c$ is the distance of the interfacial contact point for liquid-gas-sensor interface from the another end of the waveguide contacting the gas, $\theta_{ca}$ is the critical angle for sensor-gas interface, and $\theta_{cw}$ is the critical angle for sensor-liquid interface. Oca and $\theta_{cw}$ are known angles for the waveguide air interface and the waveguide water interface respectively.

The five integral terms in each of equation (1) and equation (2) represent possible (candidate) light paths. In each equation (1) and equation (2), the first integral term corresponds to light rays directed to the other light receiver via the other section (half-plane), the second integral term represents light rays produced in the gas-covered region which escape due to the angle of incidence being too large to be reflected, the third integral term represents light rays produced in the gas-covered region that reach the receiver, the fourth integral term represents light rays produced in the liquid-covered region which escape due to the angle of incidence being too large to be reflected, and the fifth integral term represents light rays produced in the liquid-covered region that are received at the receiver.

In each of equation (1) and equation (2), the first integral term, the second integral term, and the third integral term do not contribute to the intensity of light beam reaching the optical receivers and therefore may be equated to zero. The equation (1) may be rewritten as equations (3) and (4) while equation (2) may be rewritten as equations (5) and (6). Said another way, a simplified mathematic relationship for intensity of light beam reaching the first optical receiver $R_1$ is given by equation (4) and a simplified mathematic relationship for the intensity of light beam reaching the second optical receiver $R_2$ is given by equation (6).

$$IR_1 = 0 + 0 + \hat{I}_0 x_c \left(\frac{\pi}{2} - \theta_{ca}\right) + 0 + \hat{I}_0 (x_a - x_c)\left(\frac{\pi}{2} - \theta_{cw}\right) \tag{3}$$

$$IR_1 = \hat{I}_0 \left[ x_a\left(\frac{\pi}{2} - \theta_{cw}\right) + x_c(\theta_{cw} - \theta_{ca}) \right] \tag{4}$$

$$IR_2 = 0 + 0 + \hat{I}_0 x_c\left(\frac{\pi}{2} - \theta_{cw}\right) + 0 + \hat{I}_0(x_a - x_c)\left(\frac{\pi}{2} - \theta_{cw}\right) \tag{5}$$

$$IR_2 = \hat{I}_0 x_a\left(\frac{\pi}{2} - \theta_{cw}\right) \tag{6}$$

The intensity of light beam reaching the first optical receiver $R_1$ ($IR_1$) and the intensity of light beam reaching the second optical receiver $R_2$ ($IR_2$) are sensed via the respective receivers, and a difference between $IR_1$ and $IR_2$ can be estimated. The intensity of light at the point of interfacial contact ($x_c$) between the gas-liquid interface and the waveguide is computed from the estimated difference in the intensity of light beam reaching the first optical receiver $R_1$ and the second optical receiver $R_2$. The position of the point of interfacial contact ($x_c$) may be estimated via equation (7).

$$x_c = \frac{IR_1 - IR_2}{\hat{I}_0(\theta_{cw} - \theta_{ca})} \tag{7}$$

where $x_c$ is the distance of the interfacial contact point for liquid-gas-sensor interface from the another end of the waveguide contacting the gas, $IR_1$ is the sensed intensity of light beam reaching the first optical receiver $R_1$ $IR_2$ is the sensed intensity of light beam reaching the second optical receiver $R_2$, $\hat{I}_0$ is the intensity of the diffused incident light, $\theta_{ca}$ is the critical angle for sensor-gas interface, and $\theta_{cw}$ is the critical angle for sensor-liquid interface. Further, based on the estimated intensity of light beam reaching the first optical receiver $R_1$ and the intensity of light beam reaching the second optical receiver $R_2$, the length of wetted surface relative to the length of dry surface may be estimated. The intensity of light beam reaching the first optical receiver $R_1$ may be directly proportional to the dry surface of the waveguide while intensity of light beam reaching the second optical receiver $R_2$ may be directly proportional to the wet surface of the waveguide.

As an example, during conditions when the intensity of the diffused incident light, $\hat{I}_0$, is known a priori, it may be possible to estimate the wetted length on a solid surface (such as the waveguide surface) with a single optical receiver such as the first optical receiver.

In this way, the components of FIG. 1 enable a system for a sensor assembly. The system includes a waveguide adjacent to an interface 106 of a first medium and a second medium, the waveguide illuminated by diffused light from a light source. A first optical receiver is coupled to a first section receiving a first light reflected from the interface 106, the first section adjacent to the first medium, a second optical receiver coupled to a second section receiving a second light reflected from the interface 106, the second section adjacent to the second medium. The system further includes a controller with computer-readable instruction stored on non-transitory memory thereof that when executed enable the controller to: estimate a position of a point of contact of each of the first medium and the second medium with the waveguide based on the first light received at the first optical receiver and the second light received at the second optical receiver.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIGS. 2A-2E show exemplary light reflection (candidate) paths leading to a first optical receiver, $R_1$ (such as first optical receiver $R_1$ in FIG. 1), of the sensor system of FIG. 1. A sensor system is shown in contact with an interface of liquid 102 with gas 104. The sensor system may be part of a surface on which wetting is being measured. The sensor system may include a waveguide 118 facing a point of interfacial contact, $x_c$, where the liquid 102 and the gas 104 meets the waveguide 118.

Figures 2A, 2B, 2C, 2D, 2E:
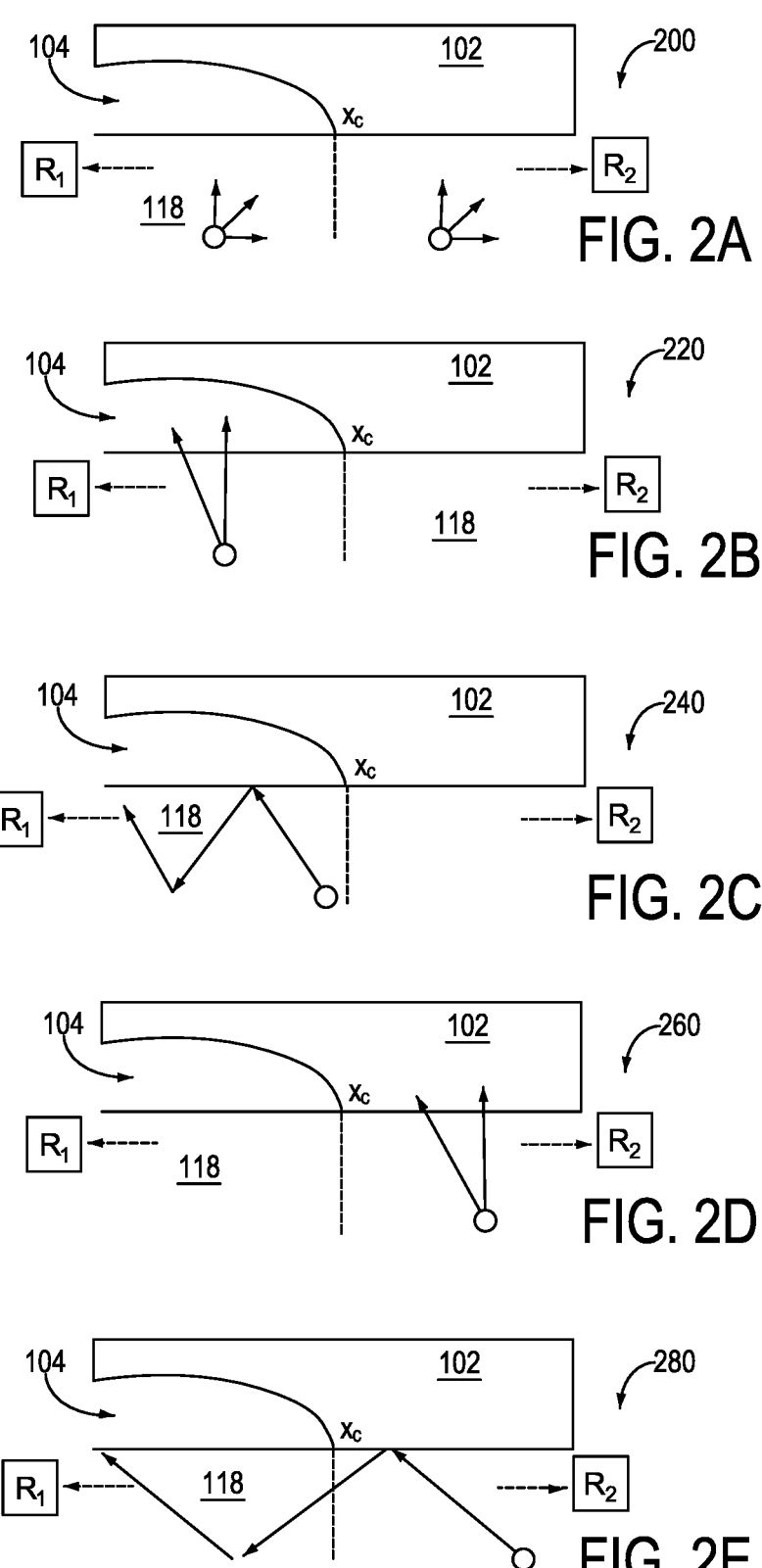
FIG. 2A shows a first example light reflection path leading to a first optical receiver of the sensor system of FIG. 1.
FIG. 2B shows a second example light reflection path leading to the first optical receiver.
FIG. 2C shows a third example light reflection path leading to the first optical receiver.
FIG. 2D shows a fourth example light reflection path leading to the first optical receiver.
FIG. 2E shows a fifth example light reflection path leading to the first optical receiver.

In the first example 200, as shown in FIG. 2A, the angle of incidence of the light on the surface of the waveguide 118 in contact with the liquid-gas interface may be between −90° and zero, causing the light rays to be directed to the second light receiver $R_2$, via the section (half-plane) opposite to the one leading to first optical receiver $R_1$. The light rays shown in the first example 200, corresponding to the first term of the integral in equation (1), are not observed by the first optical receiver $R_1$.

In the second example 220, as shown in FIG. 2B, the angle of incidence of the light on the surface of the waveguide 118 in contact with the liquid-gas interface may be between zero and the critical angle for waveguide-gas interface. Due to the angle of incidence being too large to be reflected by the waveguide-gas interface, the light rays are transmitted through the interface and are not directed to the first optical receiver $R_1$. The light rays shown in the second example 220 corresponding to the second term of the integral in equation (1) are not observed by the first optical receiver $R_1$.

In the third example 240, as shown in FIG. 2C, the angle of incidence of the light on the surface of the waveguide 118 in contact with the waveguide-liquid interface may be between the critical angle for waveguide-gas interface, $\theta_{ca}$, and 90°. Due to the angle of incidence being lower relative to the critical angle for the waveguide-gas interface, the light rays are reflected at the waveguide-gas interface before reaching the first optical receiver $R_1$. The light rays are observed by the first optical receiver $R_1$. The third example 240 corresponds to the third term of the integral in equation (1).

In the fourth example 260, as shown in FIG. 2D, the angle of incidence of the light on the surface of the waveguide 118 in contact with the liquid-gas interface may be between zero and the critical angle for waveguide-liquid interface, $\theta_{cw}$. Due to the angle of incidence being too large to be reflected by the waveguide-liquid interface, even if the light rays are at a shallow enough angle to be reflected by the waveguide-gas interface, the light rays are not directed to first optical receiver $R_1$. The light rays shown in the fourth example 260, corresponding to the fourth term of the integral in equation (1), are observed by the first optical receiver $R_1$.

In the fifth example 280, as shown in FIG. 2E, the angle of incidence of the light on the surface of the waveguide 118 in contact with the liquid-gas interface is between critical angle for waveguide-liquid interface, $\theta_{cw}$, and 90°. Due to the angle of incidence being lower, the light rays are reflected at the waveguide-liquid interface before reaching the first optical receiver $R_1$. The light rays shown in the fifth example 280, corresponding to the fifth term of the integral in equation (1), is observed by the first optical receiver $R_1$.

FIGS. 3A-3E show example light reflection (candidate) paths leading to a second optical receiver, $R_2$ (such as second optical receiver $R_2$ in FIG. 1). A sensor system is shown in contact with an interface of liquid 102 with gas 104. The sensor system may be part of a surface on which wetting is being measured. The sensor system may include a waveguide 118 facing a point of interfacial contact, $x_c$, where the liquid 102 and the gas 104 meets the sensor system.

Figure 3A:
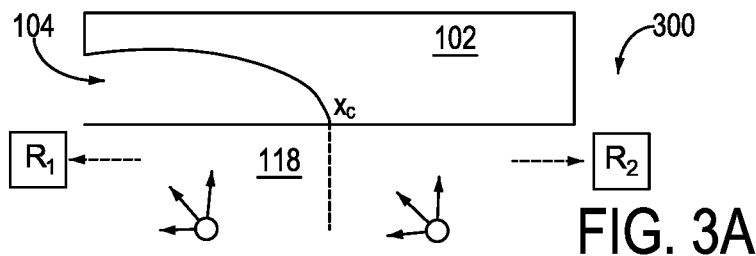
FIG. 3A shows a first example light reflection paths leading to a second optical receiver of the sensor system of FIG. 1.

In the first example 300, as shown in FIG. 3A, the angle of incidence of the light on the surface of the waveguide 118 in contact with the liquid-gas interface may be between zero and 90° causing the light rays to be directed to the other light receiver, $R_1$, via the section (half-plane) opposite to the one leading to second optical receiver $R_2$. The light rays shown in the first example 200, corresponding to the first term of the integral in equation (2), are not observed by the second optical receiver $R_2$.

Figure 3B:
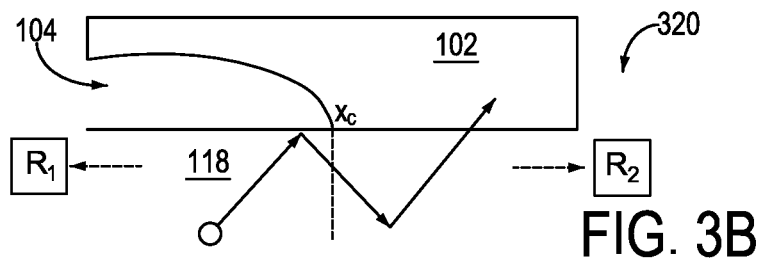
FIG. 3B shows a second example light reflection paths leading to the second optical receiver.

The second example 320, as shown in FIG. 3B, the angle of incidence of the light on the surface of the waveguide 118 in contact with the liquid-gas interface is between the negative of the critical angle for waveguide-liquid, $\theta_{cw}$, interface and zero. Due to the angle of incidence being too large to be reflected by the waveguide-liquid interface, the light rays are reflected until they reach the gas-liquid interface, and the light rays are not directed to second optical receiver $R_2$. The light rays shown in the second example 320, corresponding to the second term of the integral in equation (2), are not observed by the second optical receiver $R_2$.

Figure 3C:
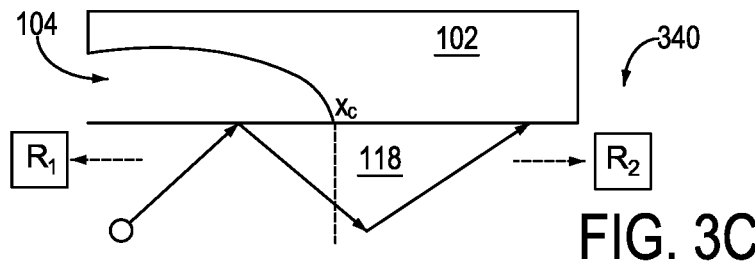
FIG. 3C shows a third example light reflection paths leading to the second optical receiver.

In the third example 340, as shown in FIG. 3C, the angle of incidence of the light on the surface of the waveguide 118 in contact with the liquid-gas interface is between 90° and the negative of the critical angle for waveguide-liquid interface. Due to the angle of incidence being lower, the light rays are reflected at the waveguide-liquid interface before reaching the second optical receiver $R_2$. The light rays shown in the third example 340, corresponding to the third term of the integral in equation (2), is observed by the second optical receiver $R_2$.

Figure 3D:
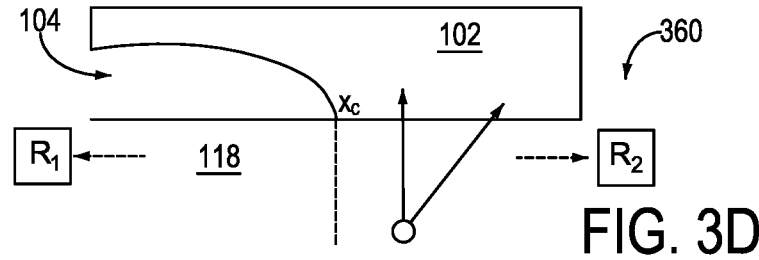
FIG. 3D shows a fourth example light reflection paths leading to the second optical receiver.

The fourth example 360, as shown in FIG. 3D, the angle of incidence of the light on the surface of the waveguide 118 in contact with the liquid-gas interface is between the negative of the critical angle for waveguide-liquid interface and zero. Due to the angle of incidence being too large to be reflected by the waveguide-liquid interface, the light rays are not directed to second optical receiver $R_2$. The light rays shown in the fourth example 360, corresponding to the fourth term of the integral in equation (2), are not observed by the second optical receiver $R_2$.

Figure 3E:
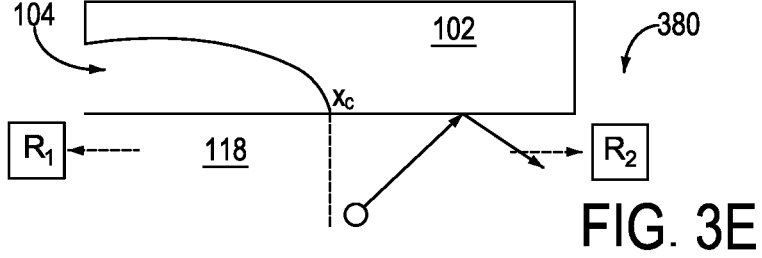
FIG. 3E shows a fifth example light reflection paths leading to the second optical receiver.

The fifth example 380, as shown in FIG. 3E, the angle of incidence of the light on the surface of the waveguide 118 in contact with the liquid-gas interface is between −90° and the negative of the critical angle for waveguide-sensor interface. Due to the angle of incidence being lower relative to the critical angle for the waveguide-liquid interface, the light rays are reflected at the waveguide-liquid interface before reaching the second optical receiver $R_2$. The light rays shown in the fifth example 380, corresponding to the fifth term of the integral in equation (2), are observed by the second optical receiver $R_2$.

FIG. 4 shows an example 400 of origin and path of travel of light rays reaching optical receivers of the sensor system. A sensor system is shown in contact with an interface of liquid 102 with gas 104. The sensor system may be part of a surface on which wetting is being measured. The sensor system may include a waveguide 118 in face sharing contact with a point of interfacial contact, $x_c$, where the liquid 102 and the gas 104 meets the surface. The surface of waveguide 118 may be divided into a first portion 414 interfacing with gas 104 (dry) and a second portion 416 interfacing with liquid 102 (wet). The first portion 414 of the waveguide 118 may lead to the first optical receiver $R_1$ while the second portion 416 of the waveguide 118 may lead to the second optical receiver $R_2$.

A first light beam may propagate from point 411 in the first portion 414 of the waveguide towards the gas-liquid interface along directions shown by arrows 402, 404, 406, 408, and 410. Due to angle of incidence of the light rays and the critical angles between the medium contacting the surface of the waveguide 118, the light rays between the point 411 and the arrow 402 (moving anti-clockwise) may be detected by the second optical receiver $R_2$ while the light rays between arrow 410 and the point 411 (moving anti-clockwise) may be detected by the first optical receiver $R_1$. The light rays between the arrows 402 and 410 may not be detected via either of the first optical receiver $R_1$ and second optical receiver $R_2$.

A second light beam may propagate from point 412 in the second portion 416 of the waveguide towards the gas-liquid interface along directions shown by arrows 422, 424, 426, 428, and 430. Due to angle of incidence of the light rays and the critical angles between the medium contacting the surface of the waveguide 118, the light rays between the point 412 and the arrow 422 (moving anti-clockwise) may be detected by the second optical receiver $R_2$ while the light rays between arrow 430 and the point 412 (moving anti-clockwise) may be detected by the first optical receiver $R_1$. The light rays between the arrows 422 and 430 may not be detected via either of the first optical receiver $R_1$ and second optical receiver $R_2$.

FIG. 5 shows an example method 500 for estimating wetting of a surface including a sensor system (such as sensor system 120 in FIG. 1). In one example, the surface may be a hull of a ship, a surface of an underground vessel, or a surface of a buoy floating in water. A wetted length of the surface may be the length along the surface in contact with the surrounding liquid. Instructions for carrying out method 500 and the rest of the methods included herein may be executed by a controller based on instructions stored on a memory of the controller and in conjunction with signals received from receivers of the sensor system, as described above with reference to FIG. 1. The controller may employ actuators of the sensor system to adjust operation, according to the methods described below.

A waveguide (such as waveguide 118 in FIG. 1) faces a point of interfacial contact $(x_c)$ between a first medium (such as liquid) and a second medium (such as gas). In step 502, the waveguide is illuminated by passing diffused light to the liquid-gas interface through the waveguide. The diffused light source can be positioned in face sharing contact with the waveguide to generate the light. The waveguide is typically made of an optically transparent material such as glass, plastic, or the like through which diffused light may propagate. At the liquid-gas interface of the waveguide, based on the angle of incidence of the diffused light, a portion of the light may be totally internally reflected. Due to a difference in critical angle between the solid-gas interface and the solid-liquid interface, the amount of liquid reflected internally can vary across the length of the liquid-gas interface. A first optical receiver (such as first optical receiver $R_1$ in FIG. 1) may be positioned proximal to a first, dry, side of the waveguide, and a second optical receiver (such as second optical receiver $R_2$ in FIG. 1) may be positioned proximal to a second, wet, side of the waveguide to detect light reflected to the waveguide from the liquid-gas interface. An amount of light internally reflected form the wet section of the waveguide may be different from the amount of light internally reflected form the dry section of the waveguide.

At 504, the amount of light reaching the first optical receiver ($IR_1$) is estimated. As an example, the controller estimates an intensity of light reaching the first receiver. At 506, the amount of light reaching the second optical receiver ($IR_2$) is estimated. As an example, the controller estimates an intensity of light reaching the second receiver. At 508, a difference between the amount of light reaching the first optical receiver ($IR_1$) and the amount of light reaching the second optical receiver ($IR_2$) is calculated.

At 510, the point of interfacial contact is estimated based on the difference between the amount of light reaching the first optical receiver ($IR_1$) and the amount of light reaching the second optical receiver ($IR_2$). The point of interfacial contact may be further based on an intensity of the diffused incident light, a predetermined critical angle for sensor-gas interface, and a predetermined critical angle for sensor-liquid interface. The position of the point of interfacial contact between the waveguide and the liquid-gas interface relative to the dry end of the waveguide is given by equation (7). The position of the point of interfacial contact relative to the dry end of the waveguide may be the wetted length of the surface.

Said another way, a first length of the waveguide in contact with gas and a second length of said waveguide in contact with liquid may be estimated. The first length of the waveguide is a function of the difference between the amount of light reaching the first optical receiver ($IR_1$) and the amount of light reaching the second optical receiver ($IR_2$), a predetermined critical angle for sensor-gas interface, and a predetermined critical angle for sensor-liquid interface, and the intensity of the diffused incident light. The second length of the waveguide is a function of the first length of the waveguide and the waveguide length (such as from 0 to $x_a$ in FIG. 1).

Based on the estimated wetting (wetted length) of the waveguide at 512, adjustment to one or more operational parameters such as guidance control can be carried out. As an example, thrust amount for propulsion of a joined vehicle and/or direction of movement of the joined vehicle may be adjusted based on the estimated wetting of the waveguide.

In this way, a difference in light intensities received by two optical receivers positioned on opposite sides of a waveguide positioned at the wetted surface can be estimated, and a position of a point of interfacial contact between a gas-liquid interface and the waveguide can be estimated based on the difference.

The methods disclosed herein may be stored as executable instructions in non-transitory memory and may be carried out by the processor in combination with the various optical receivers and other hardware. The specific routines described herein may represent one or more of any number of processing strategies such as event-driven, interrupt-driven, multi-tasking, multi-threading, and the like. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the sensor system, where the described actions are carried out by executing the instructions in a system including the various sensor hardware components in combination with an electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A sensor system for determining a linear position of a gas-liquid interface in an environment that may be in contact with one of a gas, a liquid, and both a gas and a liquid comprising:

a waveguide having a first end, a second end, a first surface portion positionable in direct contact with the environment and potentially exposed to ambient light, and a second surface portion away from the environment and potential exposure to ambient light;

a diffused light source having an intensity, said diffused light source being positioned in direct contact with said waveguide second surface portion wherein the light from said diffused light source entering through said waveguide second surface portion is provided at a frequency that is distinguishable from ambient light which may enter said waveguide first surface;

at least one optical receiver positioned at one of the two ends of said waveguide for receiving light internally reflected within the waveguide, each at least one optical receiver having a filter for filtering out ambient light, and for providing a light intensity at the frequency that is distinguishable from ambient light; and a processor joined to said at least one optical receiver to receive the light intensity received by said at least one optical receiver and to determine the linear position of the gas-liquid interface from the light intensity.

2. The system of claim 1, wherein the waveguide comprises an optically transparent material.

3. The system of claim 1, wherein said waveguide first surface portion has a first known critical angle for reflection when said waveguide first surface portion is in contact with the gas, and a second known critical angle for reflection when said waveguide first surface portion is in contact with the liquid, the first known critical angle for reflection being different from the second known critical angle for reflection, wherein said waveguide is oriented in the environment such that a first portion of the waveguide first surface portion can be in contact with the gas and a second portion of the waveguide first surface portion can be in contact with the liquid.

4. The system of claim 3, wherein said at least one optical receiver comprises:

a first optical receiver positioned at the first end of the waveguide; and a second optical receiver positioned at the second end of the waveguide.

5. The system of claim 4, wherein light from said diffused light source enters through said waveguide second surface portion and is incident on an interior of said waveguide first surface portion, a portion of the light undergoing total internal reflection at the interior of said waveguide first surface portion and being received at the first optical receiver and the second optical receiver.

6. The system of claim 5, wherein said processor is joined to the first optical receiver and the second optical receiver, said processor measuring a first intensity of light received at the first optical receiver, and a second intensity of light received at the second optical receiver, and said processor calculating the linear position of the gas-liquid interface based on the first intensity of light received at the first optical receiver and the second intensity of light received at the second optical receiver.

7. The system of claim 6, wherein calculating the linear position includes calculating a first length of the waveguide in contact with gas and a second length of said waveguide in contact with liquid.

8. The system of claim 7, wherein the first length of the waveguide is a function of a difference in the first intensity of light and the second intensity of light, the first known critical angle, the second known critical angle, and the intensity of said diffused light source.

9. A sensor system for determining a linear position of an interface comprising:

a waveguide with a first surface directly adjacent to the interface of a first medium and a second medium and a second surface wherein the first surface is potentially exposed to ambient light and the second surface is away from potential exposure to ambient light, said waveguide being linearly extended with a first end and a second end;

a light source directly adjacent to the second surface of said waveguide, the light source illuminating the waveguide with diffused light at a frequency that is distinguishable from ambient light which may enter said waveguide first surface;

a first optical receiver having a filter capable of filtering ambient light, said first optical receiver positioned proximal to the first end of the waveguide adjacent to the first medium, said first optical receiver receiving diffused light reflected from the interface at the frequency that is distinguishable from ambient light;

a second optical receiver having a filter capable of filtering ambient light, said second optical receiver positioned proximal to the second end of the waveguide adjacent to the second medium, said second optical receiver receiving diffused light reflected from the interface at the frequency that is distinguishable from ambient light; and a processor coupled to each of said first optical receiver and said second optical receiver, said processor estimating a position of the interface based on an intensity of said diffused light reflected from the interface as received at said first optical receiver relative to another intensity of diffused light reflected from the interface as received at said second optical receiver.

10. The system of claim 9, wherein a first critical angle for a boundary of said first surface of said waveguide and said first medium is different from a second critical angle for another boundary of said first surface of said waveguide and said second medium.

* * * * *